No. 807,541. PATENTED DEC. 19, 1905.
H. C. CUNNINGHAM & M. HOOPES.
CHAIN FOR GRIPPING AND SUPPORTING METAL BLANKS.
APPLICATION FILED SEPT. 20, 1905.

2 SHEETS—SHEET 1.

Witnesses:
Wilhelm Vogt
Thomas M. Smith

Inventors
Harold C. Cunningham
Maxwell Hoopes

No. 807,541. PATENTED DEC. 19, 1905.
H. C. CUNNINGHAM & M. HOOPES.
CHAIN FOR GRIPPING AND SUPPORTING METAL BLANKS.
APPLICATION FILED SEPT. 20, 1905.
2 SHEETS—SHEET 2.
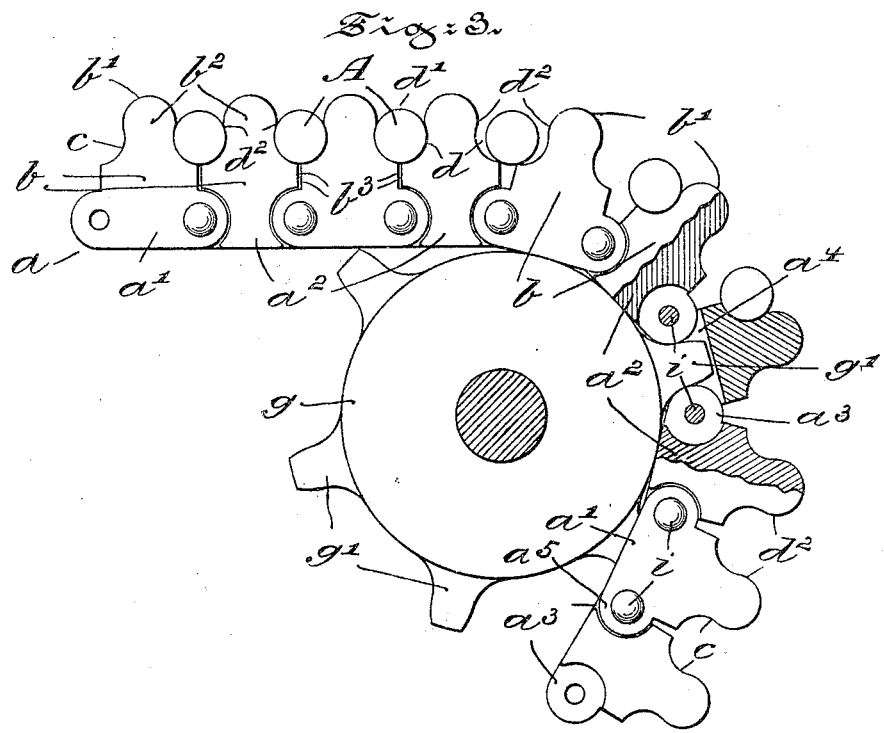
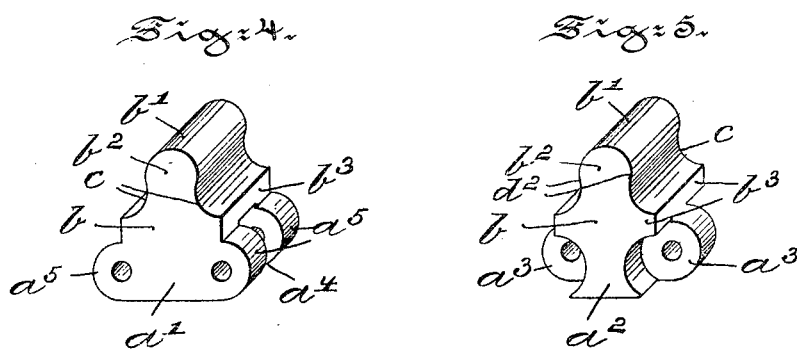
Witnesses:
Wilhelm Vogt
Thomas M. Smith.
Inventors
Havell C. Cunningham
Maximilian Hoopes

UNITED STATES PATENT OFFICE.

HOWELL C. CUNNINGHAM AND MACMILLAN HOOPES, OF PHILADELPHIA, PENNSYLVANIA.

CHAIN FOR GRIPPING AND SUPPORTING METAL BLANKS.

No. 807,541.    Specification of Letters Patent.    Patented Dec. 19, 1905.

Application filed September 20, 1905. Serial No. 279,238.

*To all whom it may concern:*

Be it known that we, HOWELL C. CUNNINGHAM and MACMILLAN HOOPES, citizens of the United States, residing at the city of Philadelphia, in the county of Philadelphia and State of Pennsylvania, have invented certain new and useful Improvements in Chains for Gripping and Supporting Metal Blanks, of which the following is a specification.

Our invention has relation to a chain for gripping and supporting metal blanks; and in such connection it relates more particularly to the construction and arrangement of the links of the chain to grip and securely hold and support metal blanks while traveling in a straight path and to release the same and to permit of the removal thereof when the chain is traveling in or occupying a curved position.

The principal objects of our invention are, first, to provide the links of a chain with extensions or projections indented or grooved at opposite sides thereof to form when pivoted together pincer-like jaws adapted to engage and securely hold in position therein a metal blank—for instance, during the passage and heating of the metal blank in a furnace—and, second, to so shape the extensions of the links that when the same are in a normal or substantially parallel position the metal blanks are securely locked therein and are released therefrom or inserted therein when the chain is moved to increase the normal distance between the link projections, and thus changing their substantially parallel position into an oblique position with respect to each other.

The nature, scope, and characteristic features of our invention will be more fully understood from the following description, taken in connection with the accompanying drawings, forming part hereof, in which—

Figure 1:
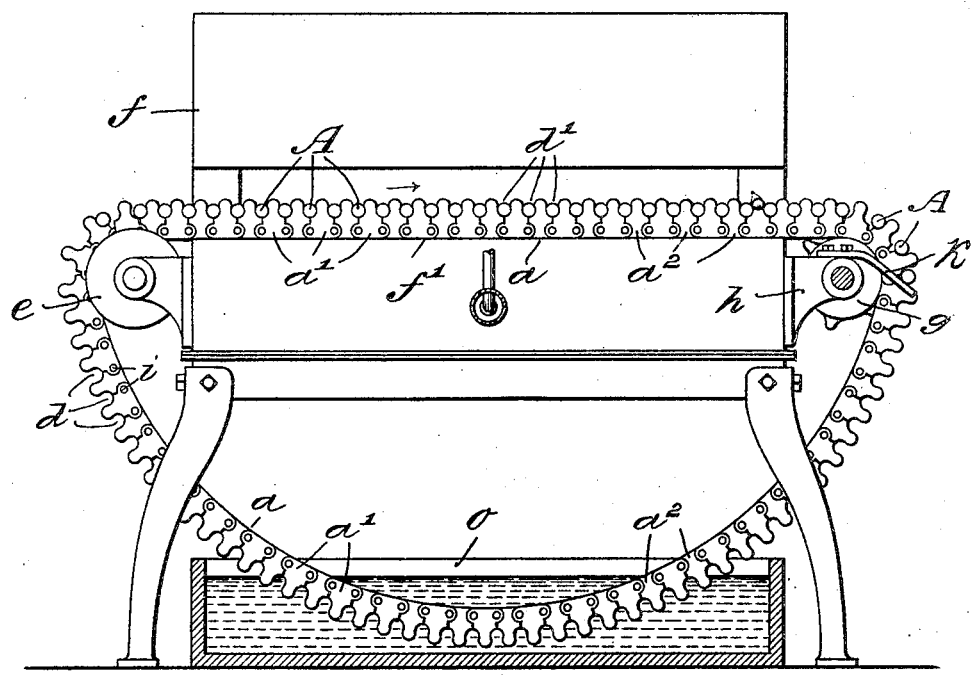
Figure 2:
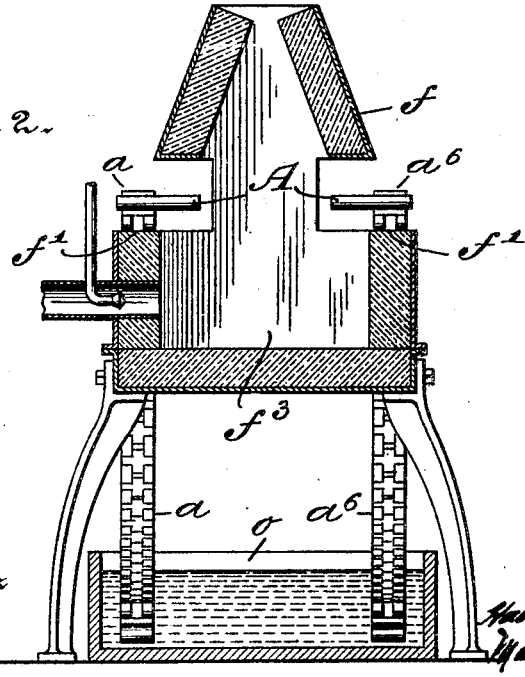

Figure 1 is a view, partly in side elevation and partly in section, illustrating an oil-furnace, a chain having projections forming pincer-like jaws engaging and locking metal blanks in position between the same during the passage of the chain and blanks through the furnace, and a water-tank for cooling the chain and its projections during their passage through the water of the tank. Fig. 2 is a cross-sectional view of the chain and furnace shown in Fig. 1 and illustrating the manner of supporting the metal blanks in the chain and exposing and holding the same over the heating-chamber of the furnace. Fig. 3 is a detail view, enlarged, illustrating, partly in side elevation and partly in section, the chain, the manner of clamping and releasing the blanks by the projections of the links, and means for actuating or moving the chain through the furnace and tank; and Figs. 4 and 5 are detail views, enlarged, illustrating, perspectively, the links forming the chain.

Referring to the drawings, $a$ represents a chain formed of links $a'$ and $a^2$, each having an extension $b$, provided at both sides with indentations $c$. At their upper ends $b'$ the extensions $b$ are preferably rounded and by being contracted below the ends $b'$ form pincer-like jaws. In the parallel or substantially parallel position of the extensions $b$ the contiguous indentations $c$ thereof form a chamber or opening $d$, substantially annular in outline, so as to nearly surround or to partially embrace an object circular in cross-section—such, for instance, as a metal blank A, which is intended to become a rivet, bolt, or screw by the formation of a head thereon. In the parallel or substantially parallel position of the extensions $b$ the blank A is prevented from being lifted or removed from the chain $c$ by the expanded portion $b^2$ of the extensions $b$, which project beyond the deepest portion of the indentations $c$, and thus form a contracted outlet $d'$ for the chamber $d$, through which the blank A cannot pass. However, it will be understood that objects of square, oval, or other cross-section will be prevented from being lifted out of the chain as long as the same cannot pass through the contracted outlet $d'$ between the extensions $b$ when the same occupy a parallel or substantially parallel position with respect to each other. This position is imparted to the extensions $b$ of the chain $a$ when the same occupies a straight position or is traveling by being moved over a level support formed, for instance, by certain of the walls of an oil-furnace, such as is shown in Figs. 1 and 2 of the drawings.

In order to insert the blanks A into the chain $a$, the extensions $b$ thereof must be brought into an oblique position with respect to each other, so as to open the same and to permit of the free entrance thereof into the indentations $c$. The rounded ends $b'$ of the extensions facilitate in this instance the insertion of the blanks A by guiding the same between the extensions. This opening of the extensions $b$ of the chain $a$ is accomplished by guiding the same over a curved surface—for instance, over a portion of the periphery of a sheaf-wheel $e$, secured to the furnace $f$, as shown in Fig. 1. In the same manner the chain $a$ must be opened to remove the blanks A therefrom, which in the present instance is accomplished by passing the same over a sprocket-wheel $g$, likewise secured to the furnace $f$. This sprocket-wheel $g$ serves to move the chain $a$, with the blanks A inserted therein, over the horizontally-disposed upper portion $f'$ of the walls of the furnace $f$, which is perfectly level, as shown in Fig. 1. In this straight position of the chain $a$ the blanks A are securely held between the pincer-like extensions $b$ of the chain $a$, and by being clamped in this position the blanks A may safely be overbalanced in the chain $a$—i. e., the greater portion thereof may project beyond the chain when it is necessary to heat one end only of the blanks A by exposing the same into and over the heating-chamber $f^3$ of the furnace $f$, as shown in Fig. 2. The blanks A so heated may then form rivets, bolts, or screws when provided with a head formed by the usual heading operation. As shown in Fig. 3, in the normal or straight position of the chain $a$ the lateral projections $b^3$ of the extensions $b$ do not abut against each other, but leave a certain space between the links $a'$ and $a^2$, which permit the extensions $b$ to be brought nearer together, so as to securely grip blanks or similar objects of less diameter than the blanks A shown. On the other hand, blanks of somewhat greater diameter than the blanks shown will still be securely gripped by the pincer-like extensions $b$, as in this instance the same will be engaged by the portions $d^2$ of the extensions and a considerable portion of the surface of the indentations $c$ adjacent to the portions $d^2$.

As shown in Figs. 3 and 4 of the drawings, the link $a'$ is provided with a slot $a^4$, adapted to receive the teeth $g'$ of the sprocket-wheel $g$, which moves the chain $a$ over the supporting-surface $f'$ of the furnace $f$ at a speed sufficient to render the overbalanced portion of the blanks A white hot or bring the same into condition for the heading operation. The teeth $g'$ of the sprocket-wheel $g$ abut against the projecting eyes $a^3$ of the link $a^2$, which are inserted into the slot $a^4$ of the link $a'$ and are connected with the same by bolts $i$, passing through the eyes $a^3$ and $a^5$ of the links $a'$ and $a^2$.

In order to facilitate the removal of the blanks A from the chain $a$, each of the brackets $h$ of the sprocket-wheel $g$ are provided with downwardly-projecting stripping-arms $k$, which by extending into the path of travel of the blanks A, carried by the chain $a$, forces the blanks A out of the chain.

Below the oil-furnace $f$ is preferably arranged a tank $o$, through the water of which the chains $a$ and $a^6$, employed in the furnace $f$, are guided to cool the chain before reaching the furnace, as shown in Figs. 1 and 2.

Having thus described the nature and objects of our invention, what we claim as new, and desire to secure by Letters Patent, is—

1. In a new article of manufacture, a chain consisting of links having a projection expanded at its free end to form in a parallel or substantially parallel position of the same, openings having contracted outlets to securely clamp and to prevent removal of an article placed in said openings.

2. In a new article of manufacture, a chain consisting of links each having a contracted and expanded projection to form in a parallel or substantially parallel position of the projections, openings with contracted outlets between the same, said openings adapted to receive and to securely hold an article introduced therein.

3. In a new article of manufacture, a chain consisting of links, each having a laterally-extending contracted and expanded projection to form in a substantially parallel position of the projections, openings with contracted outlets, said outlets adapted to securely hold the article placed in said openings.

4. In a new article of manufacture, a chain consisting of links, each having a laterally-extending contracted and expanded projection to form in a substantially parallel position of the projections openings of substantially circular outline having contracted outlets, said outlets adapted to securely hold the article placed in said openings, and to permit of the insertion or removal of the same when said projections assume a substantially oblique position with respect to each other.

In testimony whereof we have hereunto set our signatures in the presence of two subscribing witnesses.

HOWELL C. CUNNINGHAM.
MACMILLAN HOOPES.

Witnesses:
WILHELM VOGT,
THOMAS M. SMITH.